United States Patent

Dressler

[11] 3,755,052
[45] Aug. 28, 1973

[54] DECORATIVE PLASTIC TRIM STRIP

[75] Inventor: Max Dressler, Glencoe, Ill.

[73] Assignee: Protective Treatments, Inc., Dayton, Ohio

[22] Filed: May 10, 1971

[21] Appl. No.: 141,829

[52] U.S. Cl............................ 161/4, 161/5, 161/18, 161/126, 161/130, 161/410
[51] Int. Cl......................... B44f 1/02, B32b 15/08
[58] Field of Search............................... 161/2, 4–6, 161/18, 19, 33, 34, 125, 126, 130, 138, 408–410

[56] References Cited
UNITED STATES PATENTS

| | | | |
|---|---|---|---|
| 3,660,211 | 5/1972 | Brody | 161/2 |
| 3,661,686 | 5/1972 | Armstrong | 161/2 |
| 3,681,180 | 8/1972 | Kent | 161/5 |
| 3,687,792 | 8/1972 | Ruff | 161/4 |
| 3,687,794 | 8/1972 | Shanok et al. | 161/5 |
| 3,629,045 | 12/1971 | Dopera | 161/5 |
| 3,347,651 | 10/1967 | Lueck | 161/5 X |
| 3,226,287 | 12/1965 | Shanok et al. | 161/4 X |
| 2,996,822 | 8/1961 | Souza | 161/2 X |
| 3,232,818 | 2/1966 | Loew et al. | 161/5 |
| 3,250,173 | 5/1966 | Henry | 350/131 |
| 3,565,734 | 2/1971 | Shanok et al. | 161/5 |
| 3,586,592 | 6/1971 | Cahn | 161/2 |
| 3,616,100 | 10/1971 | Morita | 161/6 X |
| 3,590,768 | 7/1971 | Shanok | 161/5 X |
| 3,616,099 | 10/1971 | Shanok | 161/5 |

*Primary Examiner*—Harold Ansher
*Attorney*—Dressler, Goldsmith, Clement & Gordon

[57] ABSTRACT

A decorative plastic trim strip in which a formed metal surfaced foil is embedded in a light-transmitting plastic sheath. The foil is provided with a colorant stripe on part of its surface to produce contrasting color effects. The surface of the plastic sheath is shaped differently from the confronting surface of the formed foil to change the apparent width of the foil when viewed through the sheath.

3 Claims, 4 Drawing Figures

Patented Aug. 28, 1973
3,755,052
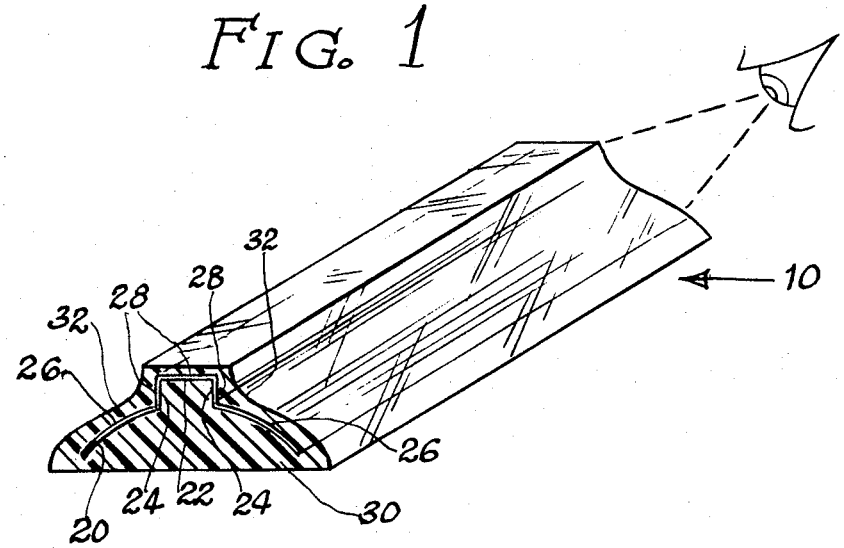
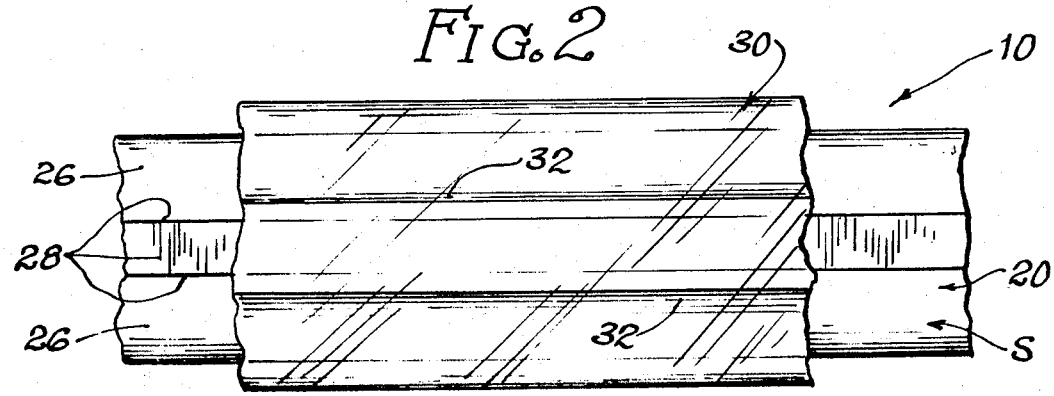
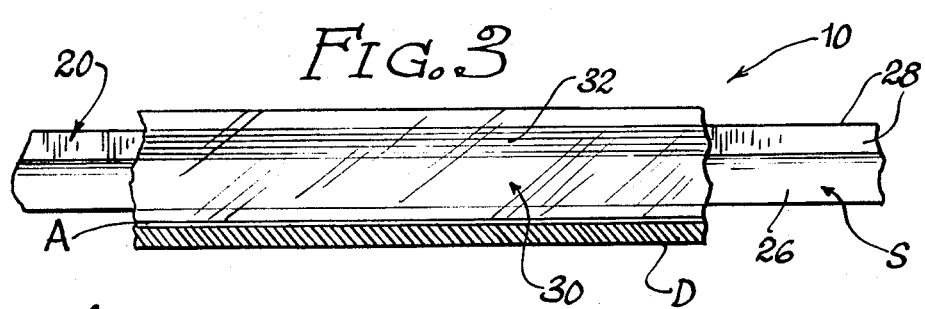
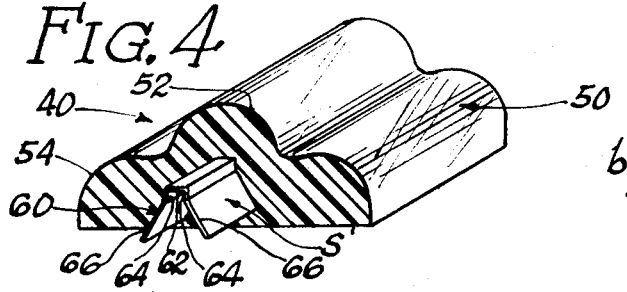
INVENTOR
Max Dressler
by Dressler, Goldsmith, Clement
and Gordon Attorneys

DECORATIVE PLASTIC TRIM STRIP

This invention relates to an improved decorative plastic trim strip comprising a transparent or translucent plastic sheath encapsulating a light-reflective foil, the foil being visible through the sheath to produce a decorative effect.

Trim strips of this general class are known and have been used in many environments, such as on the sides of automobile bodies, around automobile windows and the like. These strips have usually comprised a formed thin metal layer encapsulated in a suitable plastic sheath. The metal layer, most frequently aluminum, has been one which is vapor deposited, under vacuum, on a plastic foil, which foil is then formed and embedded in a plastic sheath or body, such as, for example, clear polyvinyl chloride or a copolymer of vinyl chloride and vinyl acetate, as by an extrusion process. Alternatively, the metal layer has comprised the highly reflective surface of a thin metal foil, such as aluminum foil, for example. The extrusion of the plastic sheath about the metal surfaced foil has served to protect the reflective surface from tarnishing, corrosion and abrasion. Patents illustrating typical products of this type and character are U.S. Pat. Nos. 3,436,297 and 3,440,129.

Normally prior art trim strips of the type described present only a metallic appearance, i.e., the metal used in making the foil strip, silvery in the case of aluminum. Efforts have been made in the past to impart other decorative characteristics to such trim strips. For example, in U.S. Pat. No. 3,136,676, it is suggested that the plastic sheath be colored or dyed, or that external flutes in the sheath be filled with a pigment or the like, thereby to alter the ornamental appearance of the foil.

In accordance with this invention, new possibilities for designing and making decorative plastic trim strips are provided. Trim strips of this invention are configured to provide a formed single encapsulated reflective foil which provides several different and contrasting surface characteristics, for example, a colored stripe centrally located on a reflective surface of contrasting color. Such contrasting color effects are obtained simply, positively and inexpensively. Further, this invention so positions the encapsulated reflective foil with respect to the surface of the plastic sheath that the apparent width of longitudinal sections of the foil is different from the actual width of such sections. This aspect of this invention may be utilized to more sharply delineate certain sections of the foil, or may be utilized to reduce the width of the foil otherwise needed for a given trim strip, thereby substantially to reduce the expense attendant the manufacture of the trim strip.

A decorative plastic trim strip of this invention incorporates an elongate, light-reflective foil encapsulated in a light transmitting plastic sheath of equal length to protect the foil from ambient conditions. The foil defines a reflective surface and is shaped to provide a plurality of integral longitudinal sections including a central dome, a pair of sections depending from the dome edges, and a pair of projecting sections extending outwardly from the lower edges of the depending sections. Preferably the dome and depending sections of the foil are flat and carry a colorant which alters their surface characteristics to reflect light from those surfaces at variance with the light reflected from the projecting sections, thus providing a contrasting color effect. The colorant which may be applied to one or more of the indicated surfaces provides the desired ornamental effect in the trim strip simply and inexpensively.

Desirably, the shapes of the outer viewing surface of the sheath and of the foil are different in transverse cross-section. This difference, when the foil is viewed by a viewer through the viewing surface, serves to change the apparent width of at least a portion of the foil. In one form, this difference in shape results in a sharper delineation of the depending sections of the foil than would otherwise be the case. In another form, this difference in outline magnifies the actual width of the foil, or sections of the foil.

Other objects, features and advantages of this invention will become apparent from the following description and drawings, of which:

FIG. 1 is a perspective view of an elongate section of one embodiment of a plastic trim strip of this invention;

FIG. 2 is a plan view of FIG. 1, partially broken away;

FIG. 3 is a side elevational view of FIG. 2; and

FIG. 4 is a perspective view of an elongate section of a second embodiment of a plastic trim strip of this invention.

FIGS. 1 to 3 illustrate a first preferred embodiment of an elongate decorative trim strip 10 of this invention. Trim strip 10 comprises an elongate, light-reflective foil strip 20 and a light-transmitting plastic sheath 30 which is of equal length. The length of each is many times greater than any cross-sectional dimension of sheath 30.

The plastic sheath 30 encapsulates and embeds foil strip 20 to protect it from ambient conditions, thereby to protect it from tarnishing, corrosion, abrasion and the like. The sheath may be made of a clear transparent polyvinyl chloride, a copolymer of vinyl chloride and vinyl acetate, methyl methacrylate, or other suitable transparent, transluscent or light-transmitting plastic materials known to the art. The foil strip may be a metallized plastic strip, suitably a plastic strip carrying a vapor deposited metal, for example, aluminum, or preferably, the foil strip is a very thin strip of metal foil, for example, aluminum, in all cases providing a shiny, light-reflective upper surface S. The foil strip is encapsulated in the plastic sheath by an extrusion process, and may be surface treated to adhere to the confronting, encapsulating plastic material. Alternatively, it may be free to move relatively to the confronting surface of the embedding plastic, thereby minimizing crazing when trim strip 10 is to be bent.

Trim strip 10 of this invention is adapted to be secured to a body to be trimmed, such as to the external surface of an automobile door D (illustrated schematically in FIG. 3). The trim strip may be mechanically secured to the door, although it is preferably adhesively secured thereto as by a layer of adhesive material A.

Foil strip 20 of aluminum (or other suitable metal) is formed into a plurality of integral longitudinal sections including a central dome section 22, a pair of spaced-apart depending sections 24 which depend from the parallel edges of central dome section 22, and a pair of outwardly projecting sections 26 which extend from the parallel lower edges of depending sections 24. In FIGS. 1 to 3, the central dome section 22 is flat and the depending sections 24 are flat and parallel to each other. Sections 24 also are of equal width, whereby their lower edges lie in a common plane which is parallel to the plane of the parallel edges of dome section 22. The projecting sections 26 are convex when viewed from the top of trim strip 10 and these also are of equal width.

Portions of surface S of foil strip 20, i.e., those of central dome section 22 and depending sections 24, have been altered to reflect light differently than light is reflected from remaining portions of surface S, i.e., the projecting sections 26. To that end, a colorant 28 is applied to the upper surfaces of sections 22 and 24 prior to the encapsulation of foil strip 20. The altered appearance of those surfaces as compared to the other portions of surface S is readily visible through the transparent plastic sheath 30. The colorant 28 may take the form of a pigment or dye applied to the surfaces indicated, or preferably may comprise a longitudinally anodized stripe imparting any desired color, be it red, green, blue or any other, to the portions of surface S intermediate those of the projecting sections 26. When trim strip 10 is viewed from its top or sides, foil strip 20 presents a colored stripe intermediate projecting sections 26, which contrasts with the color of these sections, silvery in the case of the foil strip made of aluminum.

It is within the scope of this invention to provide foil strips 20 in which the colorant 28 on the central dome section 22 is different from that on the depending sections 24, and also in which the projecting sections 26 bear the colorant and other of the sections retain the basic surface appearance of the metal used to make the foil strip.

In each case, the use of colorant 28 produces a foil giving contrasting color effects which simply and inexpensively provides a plastic trim strip having those color characteristics.

It is to be noted that plastic sheath 30 defines a transverse cross-sectional shape and outline which is different from that of the underlying foil strip 20. In FIG. 1, the portions 32 of outer viewing surface of sheath 30 are concave where they confront the altered surfaces of depending sections 24 of foil strip 20. Accordingly, when depending sections 24 are viewed through the outer viewing surface of sheath 30 the width of those sections appears to be reduced. This serves more sharply to delineate depending sections 24, thereby intensifying the appearance of the colorant 28 on the surfaces of sections 24 of the foil strip.

Referring now to FIG. 4, a modified form of plastic trim strip 40 is illustrated. It comprises a plastic sheath 50 encapsulating a formed foil strip 60, made in the manner described above.

Foil strip 60 comprises a central dome section 62, depending sections 64 and projecting sections 66. Preferably sections 62 and 64 also bear colorants, similar to those of the embodiment of FIG. 1. Foil strip 60 provides an upper viewing surface S'.

Transparent sheath 50 of trim strip 40 defines a shape and outline which is transverse cross-section is substantially different from the cross-sectional shape of the underlying foil strip 60. Thus the central surface section 52 of trim strip 40 is convex with respect to the flat dome section 62, thereby effectively magnifying the width of dome section 62 when viewed through surface section 52. Similarly, the side surface sections 54 of plastic sheath 50 are convex with respect to the underlying projecting sections 66 of the foil strip, thereby effectively magnifying the width of each of the projecting sections 66. By using such a relationship of sheath surface to foil strip surface, a foil strip having longitudinal sections of a substantially lesser width may be used, particularly when the foil strip is moved closer to the bottom surface of trim strip, thus making it possible to reduce the cost of making the strip. Of course, other relationships of sheath surface and foil strip surface may be used, to alter the visual effect of the relative widths of the foil strip sections.

It is intended that this invention shall not be limited to the specific embodiments illustrated and described since the foregoing description and drawings will suggest to those skilled in the art further modifications which are within the spirit and purview of this invention.

What is claimed is:

1. An elongate decorative trim strip, comprising an elongate light-reflective foil strip encapsulated in a light-transmitting plastic sheath of equal length to protect said foil strip from ambient conditions, said equal length being many times greater than any cross-sectional dimension of said plastic sheath, said plastic sheath providing a raised medial rib merging downwardly along concave exterior surfaces into a lateral body portion on each side and said foil strip comprising a generally U-shaped central dome centrally located in said rib and having flanges at the edges of said central dome, which flanges extend laterally into said lateral body portions, the concave surfaces of the plastic sheath producing apparent distortions of the foil strip as viewed from the exterior.

2. The elongate decorative trim strip of claim 1, in which said central dome has a flat upper surface and in which said flanges are convex when viewed from the exterior.

3. The elongate decorative trim strip of claim 1, further characterized by a colorant on the upper surface of said central dome contrasting with surface characteristics of said flanges, whereby light is reflected differently from said dome than from said flanges.

* * * * *